March 26, 1957     L. W. EDWARDS ET AL     2,786,590
APPARATUS FOR LOADING AND UNLOADING TRAILERS
Filed Nov. 17, 1953                5 Sheets-Sheet 1
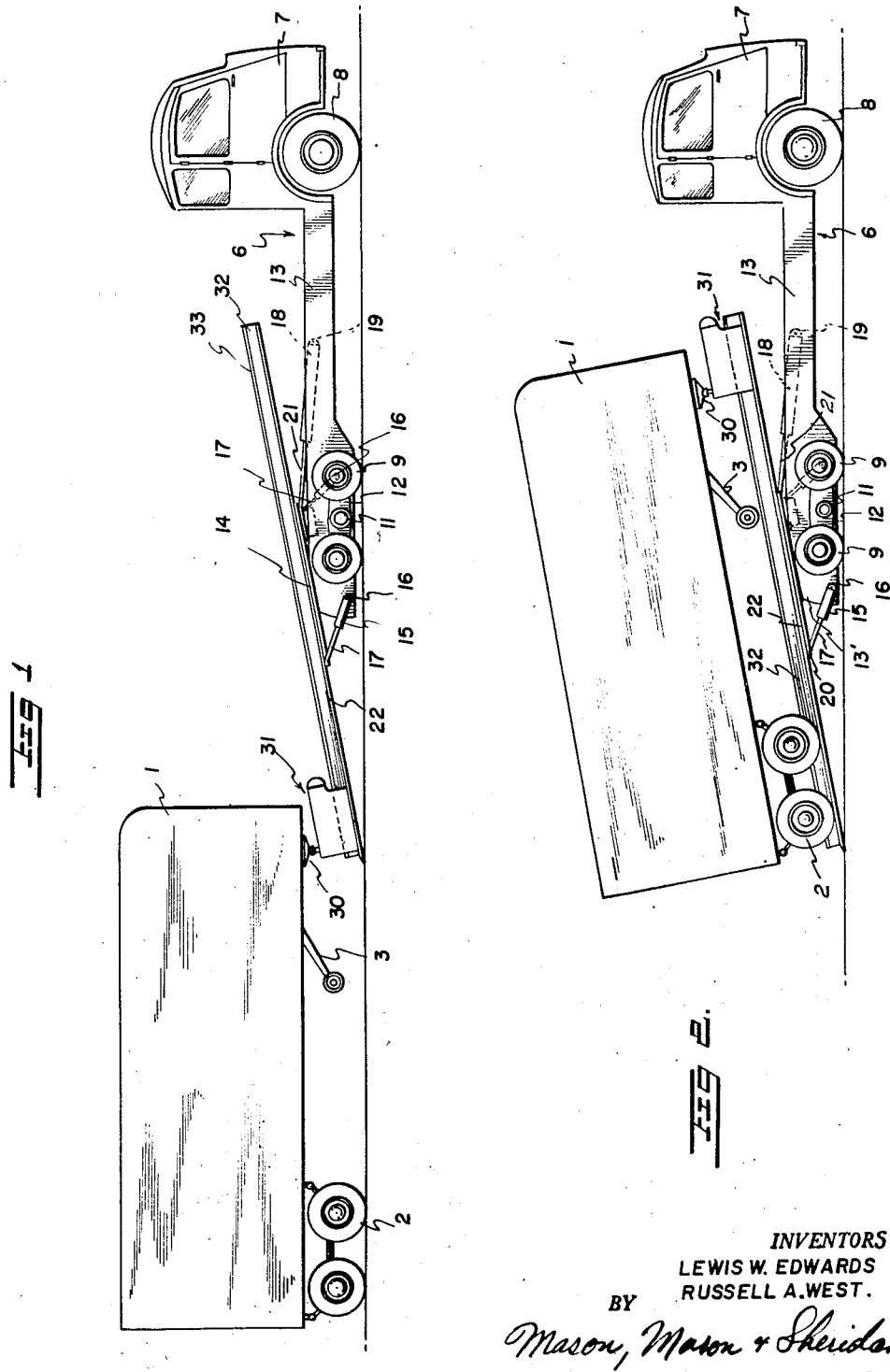
INVENTORS
LEWIS W. EDWARDS &
RUSSELL A. WEST.
BY
Mason, Mason & Sheridan
ATTORNEYS March 26, 1957    L. W. EDWARDS ET AL    2,786,590
APPARATUS FOR LOADING AND UNLOADING TRAILERS
Filed Nov. 17, 1953    5 Sheets-Sheet 2
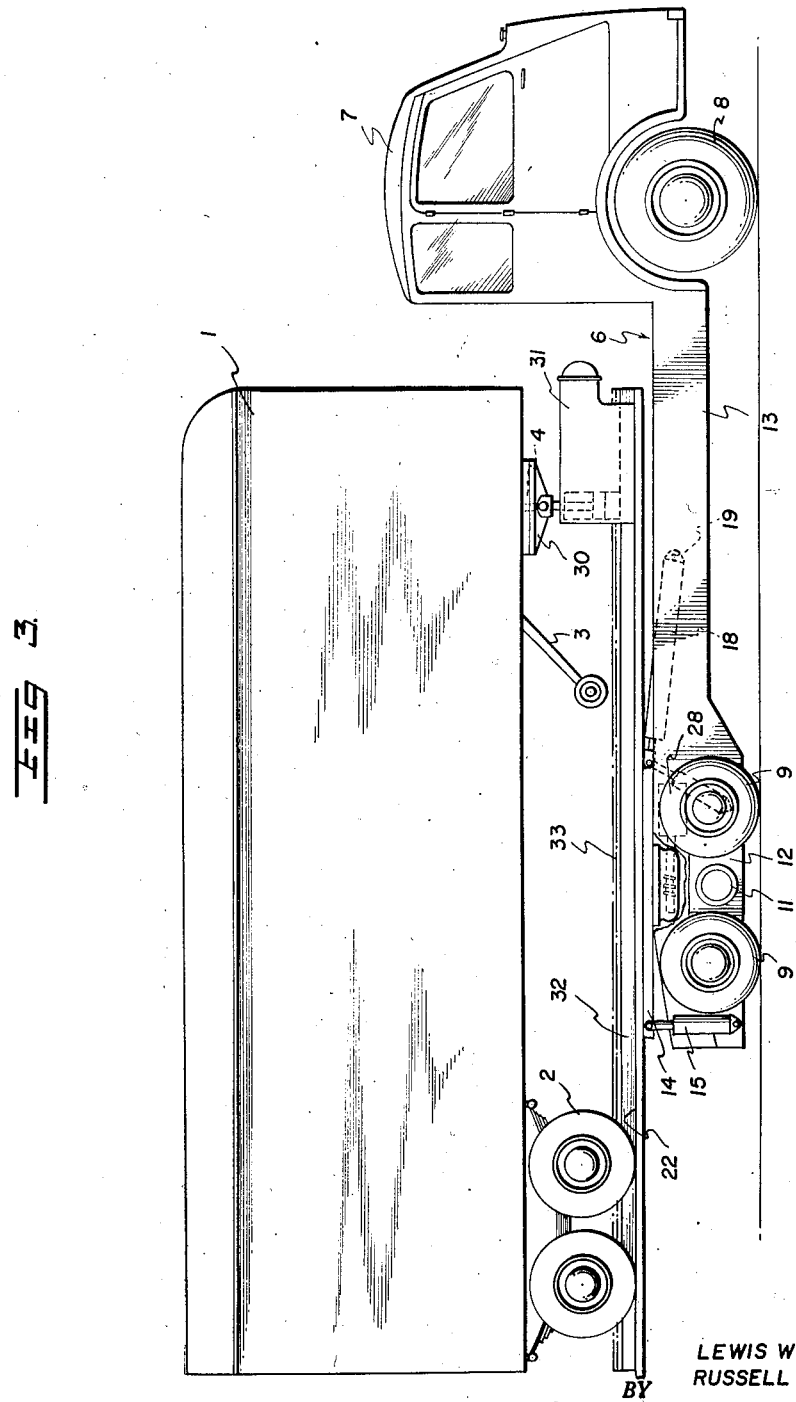
INVENTORS
LEWIS W. EDWARDS &
RUSSELL A. WEST.
BY Mason, Mason & Sheridan
ATTORNEYS March 26, 1957 L. W. EDWARDS ET AL 2,786,590
APPARATUS FOR LOADING AND UNLOADING TRAILERS
Filed Nov. 17, 1953 5 Sheets-Sheet 3

INVENTORS
LEWIS W. EDWARDS &
RUSSELL A. WEST.
BY Mason, Mason & Sheridan
ATTORNEYS March 26, 1957  L. W. EDWARDS ET AL  2,786,590
APPARATUS FOR LOADING AND UNLOADING TRAILERS
Filed Nov. 17, 1953  5 Sheets-Sheet 4
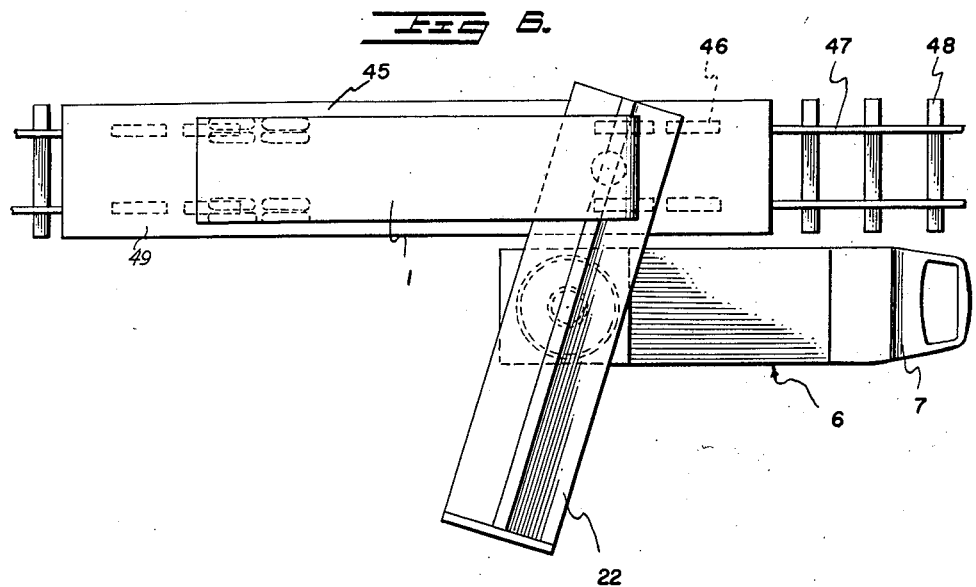
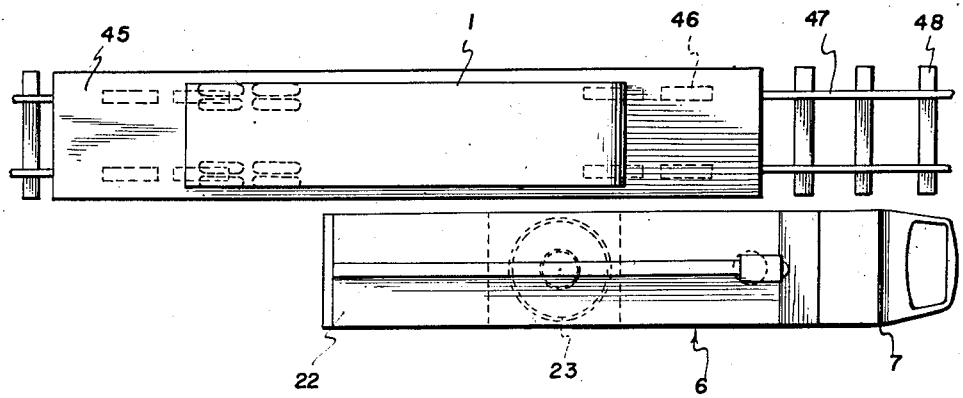
INVENTORS
LEWIS W. EDWARDS &
RUSSELL A. WEST.
BY Mason, Mason & Sheridan
ATTORNEYS March 26, 1957  L. W. EDWARDS ET AL  2,786,590
APPARATUS FOR LOADING AND UNLOADING TRAILERS
Filed Nov. 17, 1953  5 Sheets-Sheet 5

INVENTORS
LEWIS W. EDWARDS &
RUSSELL A. WEST.
BY Mason, Mason & Sheridan
ATTORNEYS

United States Patent Office 2,786,590
Patented Mar. 26, 1957

2,786,590

APPARATUS FOR LOADING AND UNLOADING TRAILERS

Lewis W. Edwards and Russell A. West, Coatesville, Pa., assignors to Lukens Steel Company, Coatesville, Pa., a corporation of Pennsylvania Application November 17, 1953, Serial No. 392,558

8 Claims. (Cl. 214—506)

This invention relates to a material handling machine for transferring equipment such as heavy vehicles to various locations and particularly to a method and apparatus for loading and unloading freight-laden trailers onto and from a railway flatcar. Another method and apparatus for performing a similar function, particularly in respect to highway semi-trailers, is shown and described in our co-pending application, Serial No. 365,061, filed in the United States Patent Office on June 30, 1953, and entitled "Method and Apparatus for Loading and Unloading Trailers and the Like onto and from Platforms and the Like." Although both machines and methods overcome many of the objections and disadvantages encountered upon loading and unloading freight-laden trailers onto and from railway flatcars, they are quite different in appearance and operation.

The apparatus and method shall hereinafter be described in connection with its principal intended use; namely, of handling trailers carrying freight by loading and unloading same onto and from railway flatcars, but it is to be understood that the present invention, as will be apparent, is not so limited in operation and use, inasmuch as it is readily adapted for other uses, such as for loading and unloading other heavy vehicles onto a raised platform, for general handling of materials, such as large logs, for transportation of vehicles generally, and for manipulating Service equipment, such as tanks.

Freight transportation is a competitive business, and there is continually a need for improved means for wholesale transportation of bulk freight. Most of the transporting systems now in practice in commerce include the use of trailers and motor trucks or tractors for manipulating the trailers over short as well as long distances. Other bulk freight is transported by water, and some is carried by the railroad. The motor truck-trailer is about the most economical and efficient means known for transporting bulk freight short distances, and this is so for many reasons, such as accessibility to the consignor's premises, operating costs, and speed. Also, utilization of automotive truck-trailers where the distance between the consignor's premises and the consignee's premises are of considerable length is common and on the whole, fairly satisfactory. However, the speed, safety, and operating costs for long distance service would be improved considerably if freight-laden trailers were transported by the railroad over the long distance or hauls and by motor trucks for the short or branch hauls. This system would undoubtedly enjoy extensive use if it were not for the difficulty encountered in loading and unloading a trailer onto and from a railway car, the apparatus of the present invention being principally intended to improve and substantially alleviate this condition. Some of the more apparent disadvantages or difficulties are in positioning and maneuvering a trailer at the railroad terminal, unloading of a selected trailer from the railroad car without first unloading all of the trailers on the car or adjoining coupled cars either in front or in the rear of the selected trailer, loading a selected trailer without arranging for prior or future predetermined sequence, loading of additional trailers on coupled cars, and the generally crowded, cumbersome, and confused conditions of railroad yard and terminal operations caused by trailer tractors, trailers, and the loading and unloading equipment. The systems and apparatuses of the U. S. patents of Francis, No. 1,968,196, and Bayerl, No. 2,121,181, are examples of the prior systems available for loading and unloading trailers from railroad cars.

It is an object of this invention to provide a method and apparatus for loading and unloading a highway semi-trailer or the like onto and from a railway flatcar or the like which overcomes the above difficulties and generally facilitates the railroad yard and terminal operations in connection with the loading and unloading and shipment of highway semi-trailers by railroad.

It is another object of this invention to provide a method and apparatus for loading and unloading trailers onto and from a selected one of a plurality of coupled flatcars without the necessity of uncoupling the cars, with a minimum number of operators, with considerable speed and ease, with a minimum amount of time and expense, and without the addition of equipment other than the usual standard railroad and trailer equipment available.

Yet another object of this invention is to provide a method and apparatus or device for loading and unloading heavy vehicles, such as trailers, onto a railway flatcar or the like, wherein the trailer may be pulled onto or pushed from a ramp of the apparatus by power drive of the device, said ramp being adapted for angular movement or tilting, rotation, vertical adjustment and general manipulation whereby it may be readily positioned in substantial surface engagement with the surface which is to be loaded or unloaded.

It is also an object of this invention to provide a material handling apparatus principally adapted for use in manipulating heavy equipment and vehicles which consists of a plurality of power driven parts for operation by a driver of the apparatus and which may raise, lower, tilt and rotate the transported equipment following the attachment of one of said parts to the equipment.

These and other objects and advantages will be more apparent from the following disclosure when taken in conjunction with the drawings, which form a part thereof, and wherein:

Figure 1 is a schematic side elevational view of the present invention, showing the device in engagement with a trailer king pin;

Figure 2 is a schematic side elevational view similar to that of Figure 1, but showing the trailer positioned on the device;

Figure 3 is another schematic side elevational view of the device with the trailer thereon but in a slightly different position than that of Figure 2;

Figure 6 is a view similar to that of Figures 4 and 5 but showing the position of the parts of the present device as the front of the trailer engages the flatcar deck;

Figure 7 is a view similar to the views of Figures 4, 5, and 6, illustrating the present apparatus and trailer and flatcar after the loading operation.

Figure 4:
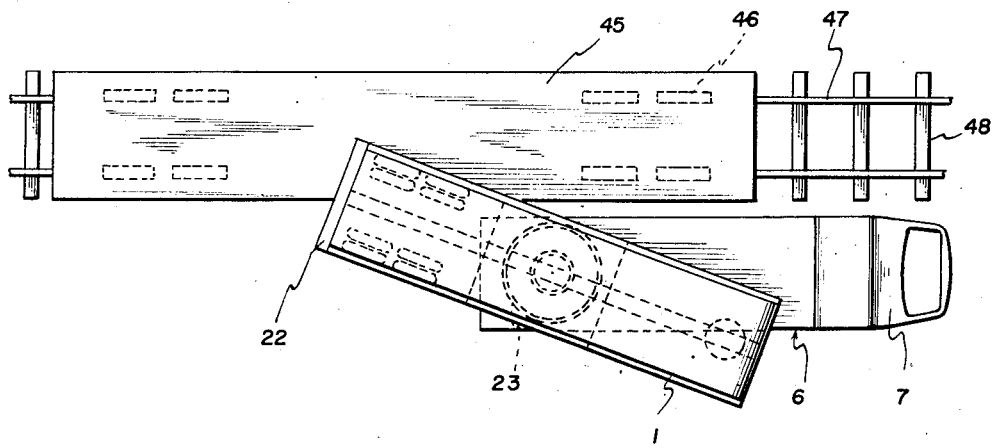
Figure 4 is a schematic top plan view of the device with the trailer thereon and positioned for engagement on the deck of a flatcar.

Broadly, the present invention comprises a loading and unloading machine for trailers having front wheels and rear wheels separated by an extended framework, a turntable construction comprising a bed and a ramp portion with means to rotate the ramp with respect to said bed, the turnable construction being mounted on the frame by means of one or a plurality of lifting cylinders pivotally connected to said frame, thereby permitting elevation and lowering of the bed and ramp. The ramp is also arranged to be tilted angularly rearwardly of the extended framework by means of at least one push-pull cylinder unit which is also pivotally affixed to said framework, and on the upper surface of the ramp there is provided a guide and rack mechanism for a powered unit with a fifth wheel attached thereto which is adapted to be moved longtudinally on the rack. The fifth wheel of the unit is adapted to be engaged with, for example, a king pin of a trailer, and said unit includes lifting cylinder means for elevating and lowering the fifth wheel in a substantially vertical plane. The main framework also includes a vehicle cab and conventional drive, transmission, and steering means whereby the entire apparatus may be driven over the ground or other surface and power operated in all respects by an operator manipulating the controls in the cab portion.

Briefly, the method of loading a highway semi-trailer from the ground onto a railway flatcar by using the present machine comprises the steps of driving the machine to a position adjacent or tandem the trailer, tilting the ramp whereby one end thereof is in substantial engagement with the ground, operating the powered fifth wheel to position the engaging means thereof beneath the trailer king pin, adjusting the height of the engaging means whereby it may be connected to the king pin, and the trailer jack-wheels may be raised from the ground, pulling the trailer completely onto the ramp, again tilting the ramp with the trailer thereon until it assumes a substantially horizontal position raised from the ground. Thereafter, the operator drives the apparatus loaded with the trailer to adjacent the selected one of a plurality of coupled railway flatcars, the trailer and ramp being preferably positioned such that they are along either side of the flatcar. At this time, the ramp is elevated to a proper height preparatory to rotating both the ramp and the trailer over the deck of the flatcar, and then the ramp is rotated angularly over the deck by means of the turntable construction and manipulated until its rear end is in substantial engagement with the deck and, if desired or necessary, supported by same. Thereafter, the trailer is backed off the rear end of the ramp onto the deck of the flatcar by means of the powered fifth wheel unit, and the ramp and apparatus generally are again manipulated such that the front end of the trailer may be propelled by the fifth wheel unit onto the deck. After application of the usual chocks and the lashing down of the trailer, the fifth wheel unit is disengaged from the king pin and the ramp rotated such that it is free from the selected deck and ready for additional loading onto other flatcars. In regard to unloading a trailer from a flatcar, the steps would be substantially in reverse to the sequence described above.

Referring to the drawings in detail, and particularly Figures 1, 2, 3, 8 and 9, numeral 1 represents a highway semi-trailer, preferably laden with freight. The trailer 1 is provided with rear wheels 2 having typical rear wheel mountings and also jack or support wheels 3 and a king pin 4. The details of the king pin, the wheel mountings and other trailer parts are not being described, as they are well known to those familiar with the trailer art. The loading and unloading apparatus of this invention is generally represented by the numeral 6 and includes front wheels 8 mounted in the usual manner, and a cab portion 7 which functions as counterweight means, as will hereinafter be apparent, and includes all of the usual parts and equipment and accessories, such as spot light means, as well as the various controls for the rest of the machine so that they may be manipulated by an operator within the cab. Rear wheels for the machine are shown at 9, and they are connected to a common axle 11 by means of member 12 which is pivoted to the axle 11, this construction being generally well known in the art and for the purpose of permitting one of the pairs of tires 9 of each side to be elevated slightly with respect to the other and to generally account for uneven contour and terrains over which the apparatus travels. The connecting frame or framework for the machine 6 is represented by the numeral 13, and to this are pivotally secured at 16, as shown, two pairs of fluid operated lifting cylinders 15, these cylinders being of conventional type and having actuating rods 17. The rods 17 are secured by suitable means 20 to the bed 14, as are the actuating rods 21 of the push-pull fluid operated cylinder units 18, the latter also being pivotally attached to framework 13 by conventional means shown at 19. The lifting cylinder units 15 are connected such that there is inter-valving of their pistons whereby they are interlocked hydraulically and adapted for operation by a single control in the cab portion 7. In the event it is desired only to interlock a pair of the units 15, this may be done, but for safety purposes, it is generally preferred to have all four lifting cylinders 15 interlocked hydraulically. Preferably, the push-pull cylinders 18 are also hydraulically interlocked and adapted for operation by a single control within the cab 7. It is preferred to have two pairs of lifting units 15 but one or more push-pull units may be satisfactory, depending upon circumstances.

The bed 14, together with ramp 22, provides a turntable construction, the ramp being mounted for rotation on bed 14 by means of roller means 23 forming a suitable bearing and the center shaft 24 extending through bed 14 and connected with the ramp 22 by any suitable means. Shaft 24 is driven by worm gear 25, the latter being rotated by worm 26 connected with drive means, such as the gear motor drive shown at 28 in Figure 3 or to the power take-off of the transmission of apparatus 6. As shown, shaft 24, worm gear 25, and worm 26 are positioned within the casing 27 attached to the bed 14 and depending therefrom. It is to be understood that other forms of turntable construction, such as shown in U. S. Patent 2,572,776, issued to H. T. Smith, come within the scope of this invention.

It can be seen that the push-pull cylinder units 18 are for the purpose of angularly manipulating the ramp 22 from a position shown in Figure 3 to the position shown in Figures 1 and 2 or intermediate positions thereof. The pairs of units 15 are primarily for the purpose of elevating or lowering the ramp when in a position as shown in Figure 3 and the rods 17 of these units are arranged to extend, without much more than guiding effect, during angular adjustment of the ramp. Regarding tilting of the turntable construction, frame 13 may have its rear end shaped to provide a bevel arrangement conforming to the tilting angle, this being shown at 13' and functioning as guiding means during the tilting operation. Portion 13' could be provided with rollers or other friction reducing means to aid in the angular movement and it is to be understood that preferably a portion 13' is provided on each side of the frame 13 so as not to interfere with the operation of cylinders 15 and other parts.

Figure 9:
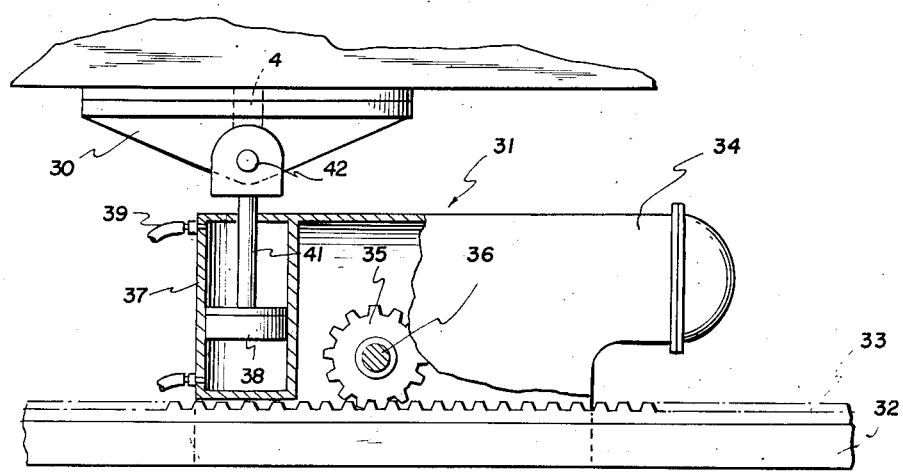
Figure 9 is a view partly in section, illustrating some of the details of the powered ramp fifth wheel of the apparatus.

Referring particularly to Figure 9, numeral 31 represents a reduction powered ramp fifth wheel unit which supplies the propelling force for pulling the trailer onto the ramp and pushing same therefrom. The unit 31 includes the fifth wheel 30 of standard construction and an end portion 34 wherein a drive motor (not shown) may be positioned, said motor being for the purpose of rotating pinion 35 through shaft 36 driven by suitable reducing means (not shown), pinion 35 meshing with the rack 33 provided on guide 32 on the upper surface of ramp 22. It can be seen that by means of the rack 33, pinion means 35 and the reduction drive means (not shown), the unit 31 may be automatically driven along the guide 32 or the longitudinal length of the ramp 22. Although not shown, there should be provided at each end of the rack 33, suitable stop means to prevent the powered mechanism 31 from running off its track. Unit 31 also includes a cylinder unit including cylinder 37, piston 38, rod 41, and fluid ingress and egress means 39. This cylinder unit is also adapted to be operated by a control within the cab portion 7, and the rod 41 is pivotally connected at 42 to the fifth wheel 30.

The views in Figures 4 to 7, inclusive, are for the purpose of depicting the operation of the present machine 6 when used in connection with loading a trailer 1 onto a flatcar 45 having the usual wheels 46 running on tracks 47 supported by the conventional ties 48. Prior to the trailer 1 being positioned on the ramp 22, as shown in Figure 4, the apparatus 6 is driven in the terminal yard to a position adjacent tandem trailer 1 which is supported, detached from its tractor, on the ground by wheels 2 and jack-wheels 3. Thereafter, the ramp 22 is tilted by the cylinders 18 until its rearmost end is in substantial surface engagement with the ground and the unit 31 is driven until its actuating rod 41 and fifth wheel 30 is beneath the king pin 4, whereupon the wheel 30 is extended to engage and connect with the king pin 4 by means well known in the art and raise the jack-wheels 3 from the ground for clearance purposes, this operation resulting in the position of parts as shown in Figure 1. Thereafter, the unit 31 is power driven on rack 33 to pull the trailer 1 onto the ramp as shown in Figure 2, and at that time, push-pull cylinder units 18 are operated until the loaded machine appears as in Figure 3. The apparatus is then driven with the trailer aboard to adjacent and alongside a selected flatcar 45 and usually a railway flatcar such as 45 would be coupled at each end to another flatcar. At this time, the device appears as in Figure 4, except that the turntable has not been operated.

Figure 5:
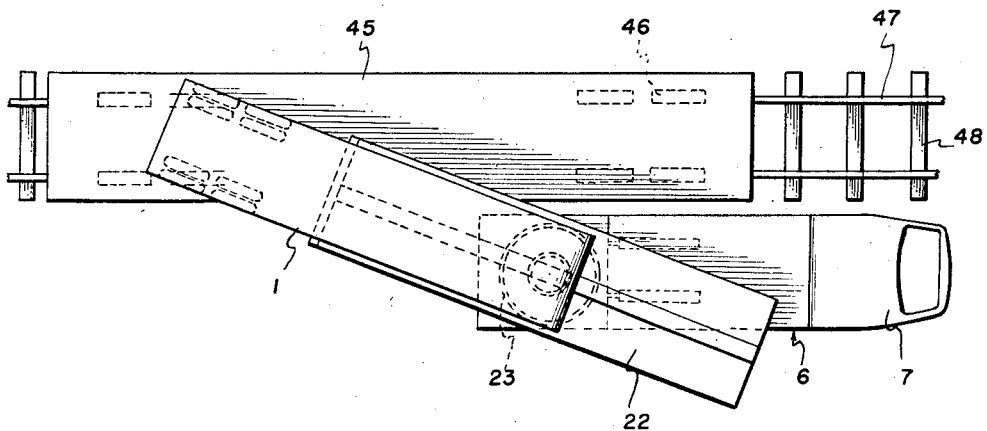
Figure 5 is a view similar to Figure 4, but showing the rear wheels of the trailer on the flatcar deck.
Figure 8:
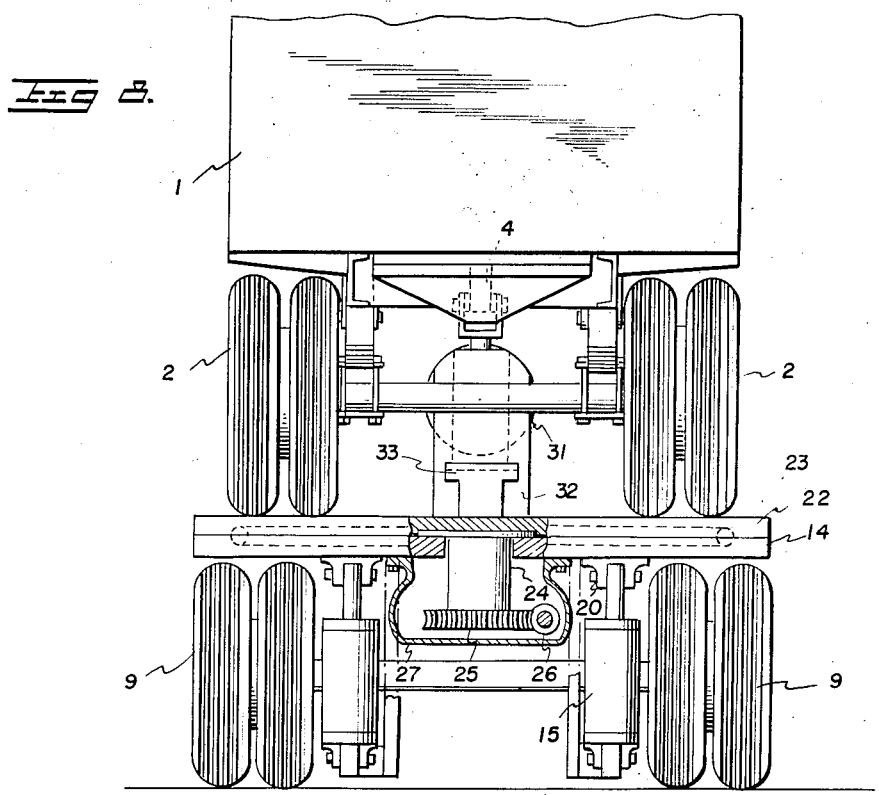
Figure 8 is a rear elevational view partly in section, of the apparatus with the trailer thereon when in the approximate position shown in Figure 3.

The operator now manipulates lifting units 15 to adjust the ramp 22 to a proper horizontal height with respect to surface 49, and thereafter the operator causes worm 26 to be driven and thereby the ramp 22 rotated over the deck of the flatcar 45 in a manner substantially as shown in Figure 4. At this time, the entire apparatus 6 may be driven forward or backward a slight amount and the ramp 22 tilted, if necessary, so that the rearward end of the ramp is in substantial surface engagement with the upper surface 49 of the deck of flatcar 45. Power unit 31 is again manipulated until the trailer is backed off the rear end of the ramp 22 onto the deck 49 as shown in Figure 5; and at this time, the usual chocks or wedges are preferably placed under the aft side of the rearmost tires 2 to act as a fulcrum for the turning of the rest of the trailer. The chocks also function to assist the operator in the proper location on the deck and as a safety device. Next, the fifth wheel unit 31 is operated to move preferably forward on the ramp 22 as the ramp is rotated in turntable fashion from the position shown in Figure 5 to that shown in Figure 6. During this last operation, it may be necessary to propel the complete loading machine 6 forward or backward an amount depending upon the length of the trailer, the position of the trailer on the ramp, or location of the machine 6 prior to transfer of the trailer on the flatcar 45 and, in this connection, it is clear that no such movement of the loading machine 6 would be necessary if the center of the turntable construction or shaft 24 were maintained throughout this last named operation in alignment with the center of the connecting rod 41 of the fifth wheel unit 31. In other words, this juggling is necessary only if the turning radii of the operations cannot be coordinated to be maintained constant, or substantially so, the radii being the distance between the center of shaft 24 and a common point and the center of rod 41 and said common point.

When the trailer is properly positioned over its intended location on the flatcar 45, as shown in Figure 6, the jack-wheels 3 are lowered, which would not be necessary with a depressed guide 32, as is the rod 41, so that the jack-wheels may engage the deck 49 and thereafter lashing or securing of the trailer onto the deck 49 takes place. For example, the usual chocks or wedges for holding the trailer tires in position may then be employed, and the front and rear of the trailer may be lashed down by chains or the like. Following this, the fifth wheel unit 31 is disengaged from the king pin 4, and the ramp 22 is rotated back to its normal position as shown in Figure 7, whereupon the machine 6 with its components in normal position is available for maneuvering about the railway terminal for further similar use or for unloading a trailer or the like from a flatcar or the like 45.

In connection with unloading a trailer 1 from deck surface 49 or other platform, the unloading steps are in the exact reverse order to the sequence described above, with the exception of placing the chocks on the forward side of the rear tires to act as a fulcrum, and are believed to be obvious. For example, the fifth wheel unit 31 is manipulated, as is the ramp 22, so that the wheel 30 may be connected to the king pin 4, and the parts assume the position as shown in Figure 6. Thereafter, the trailer is unlashed and by the reverse of the manipulation previously described, the parts assume the positions in the sequence shown in Figures 5, 4, 3, 2 and 1.

It is to be noted that the operations described are all adapted to be controlled by the operator within the cab 7, and it is believed that it is not necessary to disclose in detail just how the various drive units and controls are connected to a common panel within the cab 7, as such is believed within the skill of a successful mechanic. It is clear, therefore, that a single operator may perform the method described, although assistance probably would be of necessity in connection with applying the chocks, lashing the trailer to the deck 49, and in guiding the operation generally. Of interest, the trailer weight, when loaded on the apparatus 6, is primarily distributed over the multiple rear tires 9 with a minimum distribution over the front driving and steering wheel.

The cab portion 7 of the present apparatus 6 may also include suitable gauge and recording equipment connected with the lifting cylinders 15 whereby the trailer may be weighed for tariff purposes, this type of arrangement being well known and along the lines referred to in said copending application Serial No. 365,061. Referring to Figure 6 of the drawing, when the trailer 1 is thus positioned on the flatcar, the apparatus 6 may be employed to move the trailer longitudinally of the flatcar for positioning purposes. It has been mentioned that the present apparatus may be utilized in connection with heavy logs and the like, and it is to be understood that, in such instances, chains or the like adapted to be connected with unit 31 would be secured or attached to the logs.

The above description and drawings disclose a single embodiment of the invention, as specific language has been employed in describing the several figures. It will, nevertheless, be understood that no limitations of the scope of the invention are thereby contemplated, and that various alterations and modifications may be made such as would occur to one skilled in the art to which the invention relates. For example, instead of the push-pull cylinder units 18, mechanical crank means could be employed to tilt the ramp and bed. Still further, guide 32 and rack 33 could be depressed in ramp 22 whereby the upper surface of the rack would be substantially flush with the upper surface of the ramp and such an arrangement would eliminate the necessity of raising the jack-wheels 3 upon loading and unloading the trailer. This

We claim:

1. Apparatus for loading and unloading semi-trailers or the like onto a railway flatcar comprising a frame mounted on a conveying means and adapted to be power driven over the ground, a ramp onto which the trailer is adapted to be positioned, a means for elevating said ramp with respect to said frame, means for mounting said ramp in turntable fashion on said frame, means for rotating said ramp with respect to said frame, a fifth wheel unit mounted for movement on said ramp, means to tilt said ramp such that it is in substantial surface engagement with the surface on which the trailer is located, said fifth wheel unit having means engageable with a portion of the trailer whereby the trailer may be moved onto and from said ramp.

2. Apparatus for loading and unloading semi-trailers or the like onto a railway flatcar comprising a frame mounted on wheels and adapted to be power driven over the ground, a ramp onto which the trailer is adapted to be positioned, means for mounting said ramp in turntable fashion on said frame, means for rotating said ramp with respect to said frame, a fifth wheel unit mounted for longitudinal movement on said ramp, means to tilt said ramp such that it is in substantial surface engagement with the surface on which the trailer is located, said fifth wheel unit having means engageable with a portion of the trailer whereby the trailer may be pulled onto and pushed from said ramp, and means including at least a pair of lifting cylinder units for raising and lowering said ramp in a substantially horizontal plane.

3. Apparatus for loading and unloading semi-trailers or the like onto a railway flatcar comprising a frame mounted on wheels and adapted to be power driven over the ground, a ramp onto which the trailer is adapted to be positioned, means for mounting said ramp in turntable fashion on said frame, means for rotating said ramp with respect to said frame, a fifth wheel unit mounted for longitudinal movement on said ramp, means to tilt said ramp such that it is in substantal surface engagement with the surface on whch the trailer is located, said fifth wheel unit having means engageable with a portion of the trailer whereby the trailer may be pulled onto and pushed from said ramp, and means including at least a pair of lifting cylinder units for raising and lowering said ramp in a substantially horizontal plane, said tilting means including at least one fluid operated cylinder and piston and rod unit pivotally mounted on said frame and connected to said ramp.

4. Apparatus for loading and unloading semi-trailers or the like onto a railway flatcar comprising a frame mounted upon conveying means and adapted to be power driven over the ground, a ramp onto which the trailer is adapted to be positioned, means for mounting said ramp in turntable fashion on said frame, means for rotating said ramp with respect to said frame, a fifth wheel unit mounted for movement on said ramp, engageable means of said fifth wheel unit including a lifting cylinder unit operable in a substantially vertical plane, means to tilt said ramp such that it is in substantial surface engagement with the surface on which the trailer is located, said fifth wheel unit having means engageable with a portion of the trailer whereby the trailer may be moved onto and from said ramp.

5. For use with material handling apparatus including a semi-trailer or the like frame mounted for movement on wheels, a tiltable and rotatable ramp on said frame, the sub-combination of a unit mounted for substantial longitudinal movement on said ramp, power means for so moving said unit, and means for guiding said unit during movement, the unit having guided means engageable with the semi-trailer or the like, said last-named means being bodily shiftable and means for raising and lowering the king pin, said king pin being also longitudinally movable with said unit on said ramp.

6. The structure of clam 5 in which said power means includes a rack, a pinion meshing with said rack and a power driven shaft mounting said pinion.

7. The structure of claim 5 in which said means for raising and lowering said king pin comprises a fluid actuating means.

8. The structure of claim 5 in which said means for raising and lowering said king pin comprises a fluid actuating means having a piston and cylinder mounted on said unit, said piston being operatively connected to said king pin.

References Cited in the file of this patent

UNITED STATES PATENTS

| 1,751,717 | Romine | Mar. 25, 1930 |
| 1,910,398 | Ludington | May 23, 1933 |
| 2,121,181 | Bayerl | June 21, 1938 |
| 2,204,667 | Dooley et al. | June 18, 1940 |
| 2,317,508 | Zoder | Apr. 27, 1943 |
| 2,447,559 | Bloamers | Aug. 24, 1948 |
| 2,613,827 | Van Doorne | Oct. 14, 1952 |
| 2,621,814 | Lisota | Dec. 16, 1952 |
| 2,635,430 | Hodges et al. | Apr. 21, 1953 |

FOREIGN PATENTS

| 661,995 | Germany | July 1, 1938 |
| 852,680 | Germany | Oct. 16, 1952 |
| 1,024,298 | France | Jan. 7, 1953 |